United States Patent [19]

Suzuki

[11] Patent Number: 5,160,003
[45] Date of Patent: Nov. 3, 1992

[54] LOCK-UP CONTROL FOR SMOOTH START-UP

[75] Inventor: Yutaka Suzuki, Atsugi, Japan

[73] Assignee: Nissan Motor Co., Ltd., Yokohama, Japan

[21] Appl. No.: 681,675

[22] Filed: Apr. 8, 1991

[30] Foreign Application Priority Data

Apr. 6, 1990 [JP] Japan ................................. 2-92668

[51] Int. Cl.$^5$ ............................................... F16D 47/02
[52] U.S. Cl. .............................. 192/3.31; 192/0.033; 192/0.076; 192/0.096
[58] Field of Search .............. 192/0.033, 0.076, 0.096, 192/3.31, 3.33, 103 F; 74/890; 475/69

[56] References Cited

U.S. PATENT DOCUMENTS

| | | | |
|---|---|---|---|
| 3,966,032 | 6/1976 | Koivunen | 192/3.31 X |
| 4,428,467 | 1/1984 | Hiramatsu | 192/0.076 X |
| 4,518,068 | 5/1985 | Oguma et al. | 192/0.052 |
| 4,526,557 | 7/1985 | Tanaka et al. | 474/18 |
| 4,660,697 | 4/1987 | Yoneda et al. | 192/0.033 |
| 4,664,235 | 5/1987 | Yokoyama | 192/0.033 X |
| 4,722,429 | 2/1988 | Kono | 192/0.076 X |
| 4,724,939 | 2/1988 | Lockhart et al. | 192/3.31 |
| 4,735,113 | 4/1988 | Yamamuro et al. | 74/866 |
| 4,757,889 | 7/1988 | Brown et al. | 192/3.31 X |
| 4,781,279 | 11/1988 | Georg | 192/3.31 X |
| 4,843,918 | 7/1989 | Morimoto | 192/3.31 X |
| 4,876,922 | 10/1989 | Koshimo | 192/3.33 X |
| 4,880,094 | 11/1989 | Ohkumo | 192/0.076 X |
| 4,957,194 | 9/1990 | Sawa et al. | 192/0.096 |
| 5,010,990 | 4/1991 | Yoshimura et al. | 192/3.31 X |

FOREIGN PATENT DOCUMENTS

| | | | |
|---|---|---|---|
| 0180209 | 5/1986 | European Pat. Off. . | |
| 4025455 | 3/1991 | Fed. Rep. of Germany . | |
| 58-94667 | 6/1983 | Japan . | |
| 59-280159 | 12/1984 | Japan | 192/0.096 |
| 60-1460 | 1/1985 | Japan | 192/3.31 |
| 60-49160 | 3/1985 | Japan | 192/3.31 |
| 60-143266 | 7/1985 | Japan | 192/3.31 |
| 61-193933 | 8/1986 | Japan | 192/0.096 |
| 63-172058 | 7/1988 | Japan . | |

Primary Examiner—Leslie A. Braun
Assistant Examiner—Nicholas Whitelaw
Attorney, Agent, or Firm—Foley & Lardner

[57] ABSTRACT

A lock-up control for smooth start-up of a motor vehicle is disclosed. A target engine revolution speed is set as a function of a load on an engine of the vehicle, and an operating signal on which an electric actuator for a lock-up control operates is modified in such a direction as to bring an actual engine revolution speed into agreement with the target engine revolution speed until the lock-up clutch is completely engaged.

7 Claims, 6 Drawing Sheets

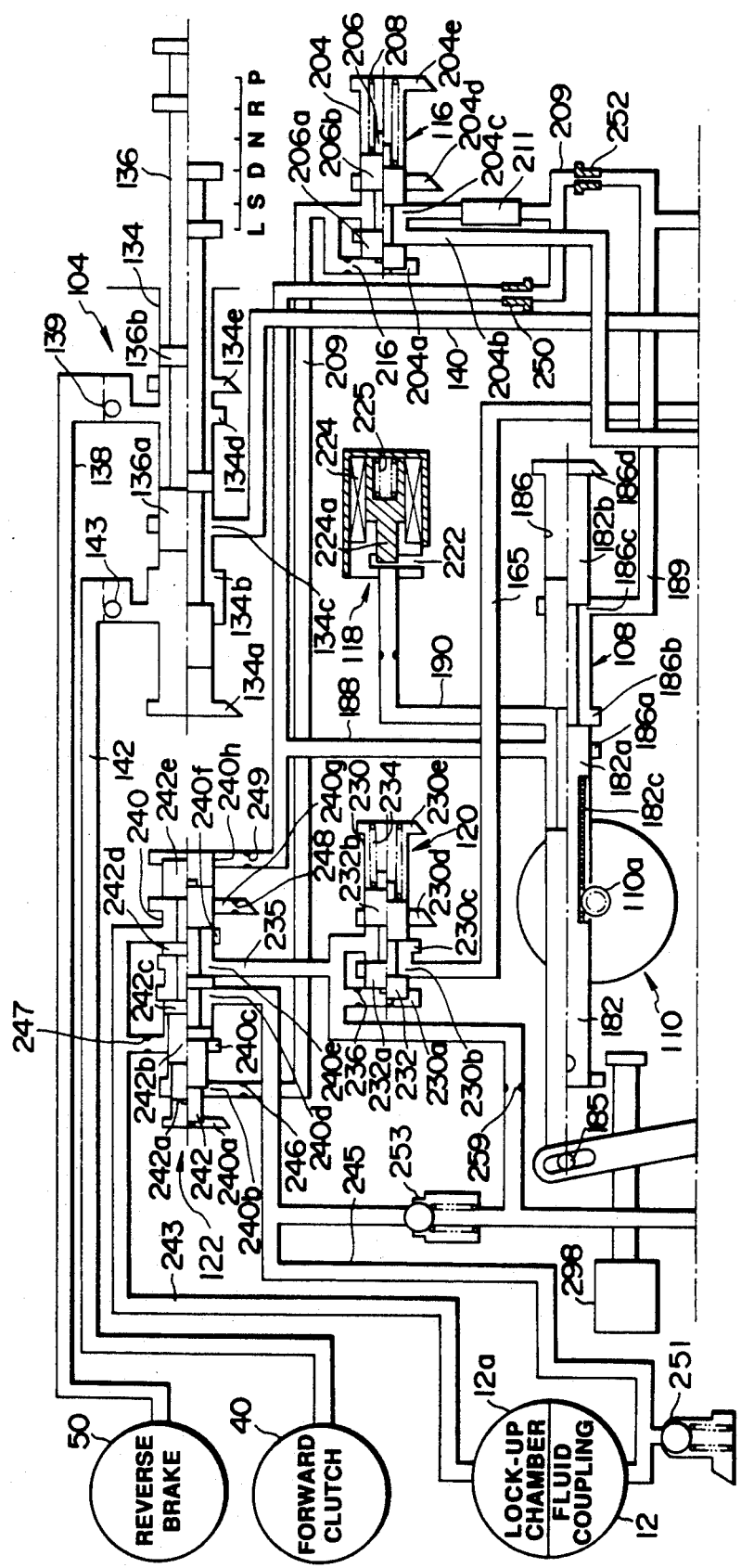

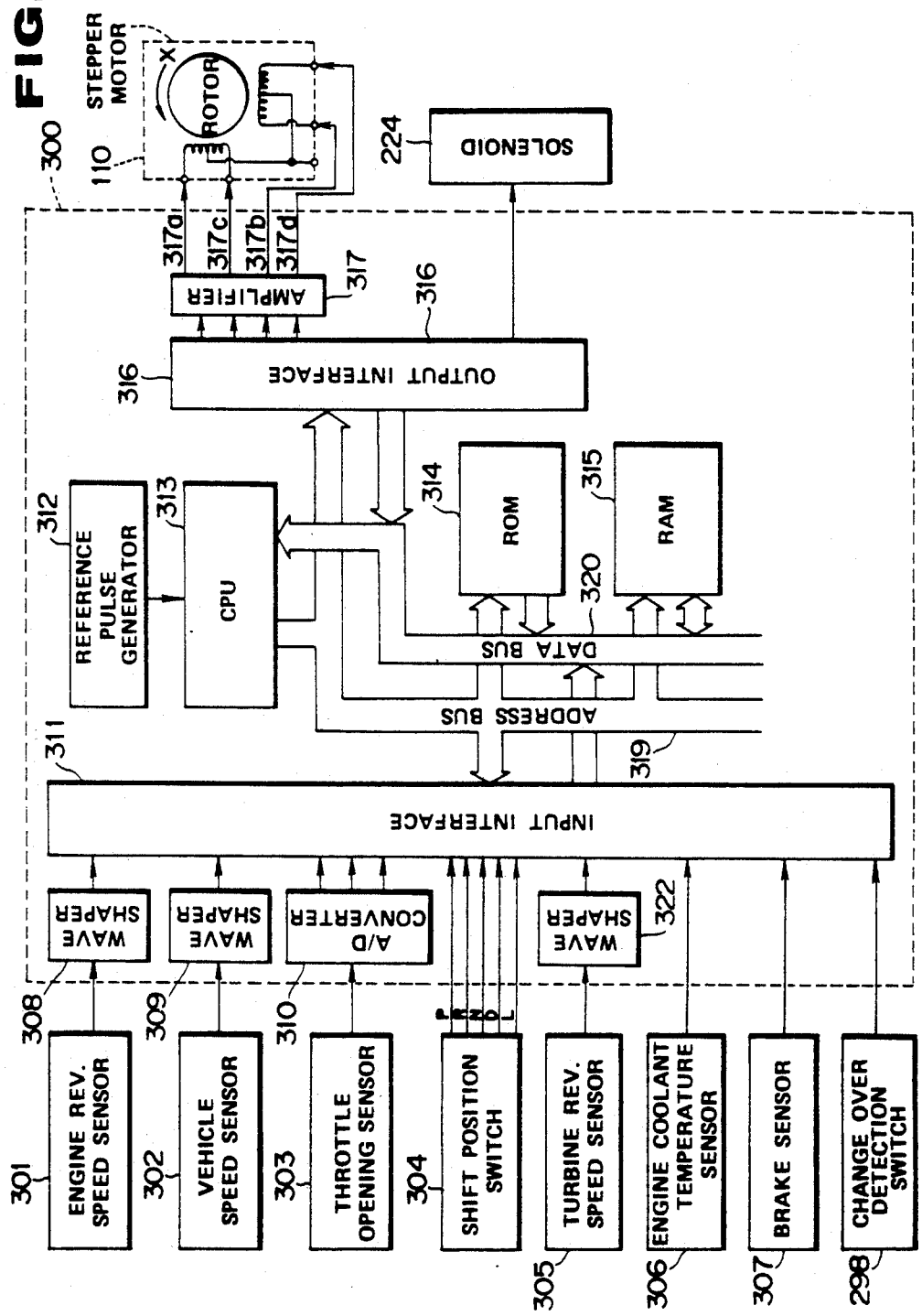

LOCK-UP CONTROL FOR SMOOTH START-UP

RELATED APPLICATIONS

U.S. patent application Ser. No. 07/681,673 claiming priority on Japanese patent application No. 2-92667 filed on Apr. 6, 1990; and U.S. patent application Ser. No. 07/681,674 claiming priority on Japanese patent application No. 2-92669 filed on Apr. 6, 1990:

BACKGROUND OF THE INVENTION

The present invention relates to a system and a method for adaptive control of a lock-up clutch in a hydrokinetic torque transmitting unit.

Japanese patent application First Publication (unexamined) No. 63-172058 discloses a system for a control of a lock-up clutch in a hydrokinetic torque transmitting unit including a pump impeller, and a turbine runner. When it is engaged, the lock-up clutch connects the turbine runner to the pump impeller. The system comprises an electro-hydraulic circuit, including an electric actuator in the form of a lock-up solenoid, for hydraulically controlling engagement of the lock-up clutch, and a control unit for generating an operating signal supplied to the electric actuator. The duty of the lock-up solenoid is varied by the operating signal generated by the control unit. When duty of the lock-up solenoid is zero, the lock-up clutch is released. After the control unit starts generating the operating signal, the duty of the lock-up solenoid gradually increases since the operating signal is indicative of the duty determined in the control unit. After a time interval, engagement of the lock-up clutch is initiated, and when the duty attains a predetermined value, the lock-up clutch is fully engaged. Describing this process of engagement in other words, a slip in the hydrokinetic torque transmitting unit starts decreasing after the initial engagement of the lock-up clutch.

In the case where a fluid coupling with a lock-up clutch is used as a hydrokinetic torque transmitting unit, it is the common practice to engage the lock-up clutch at a very low vehicle speed immediately after the motor vehicle has started moving from a standstill. If this lock-up process is conducted by controlling the duty of a lock-up solenoid in such a manner as to decrease a difference between an actual slip in the fluid coupling and a target slip, there is the tendency that a rapid increase in engine speed occurs to bring an actual slip in the fluid coupling into agreement with a target slip since a revolution speed of a turbine runner stays very slow immediately after the vehicle has moved from a standstill. This increase in engine speed is felt by a driver of the vehicle as engine racing.

The present invention aims at improving a control of a lock-up clutch in a hydrokinetic torque transmitting unit such that, during engagement of the lock-up clutch immediately after the motor vehicle has moved from a standstill, variation of engine speed is sufficiently smooth.

SUMMARY OF THE INVENTION

According to one aspect of the present invention, there is provided a system for a control of a lock-up clutch in a hydrokinetic torque transmitting unit including a pump impeller coupled with an engine, and a turbine runner, the lock-up clutch being engageable to connect the turbine runner to the pump impeller, the system comprising:

means, including an electric actuator, for controlling engagement of the lock-up clutch;

means for generating an operating signal supplied to said electric actuator, wherein, during engagement of the lock-up clutch, a target engine revolution speed is determined, and an actual engine revolution speed is detected, and said operating signal is modified in such a direction as to decrease said difference toward zero until the lock-up clutch is completely engaged.

According to another aspect of the present invention, there is provided a method for a control of a lock-up clutch in a hydrokinetic torque transmitting unit including a pump impeller coupled with an engine, and a turbine runner, the lock-up clutch being engageable to connect the turbine runner to the pump impeller, the method comprising the steps of:

controlling engagement of the lock-up clutch in response to an operating signal;

generating said operating signal, wherein, during engagement of the lock-up clutch, a target engine revolution speed is determined, and an actual engine revolution speed is detected, and said operating signal is modified in such a direction as to decrease said difference toward zero until the lock-up clutch is completely engaged.

BRIEF DESCRIPTION OF THE DRAWINGS

FIGS. 2A and 2B, and when combined, illustrate an electro-hydraulic circuit for the automatic transmission;

FIG. 3 is a block diagram of a control unit for the electro-hydraulic circuit;

DETAILED DESCRIPTION OF THE INVENTION

Referring to FIGS. 1, 2A, 2B, and 3, reference is made to U.S. Pat. No. 4,735,113 issued to Yamamuro et al., on Apr. 5, 1988 which is hereby incorporated by reference in its entirety. Specifically, reference should be made to FIG. 2, 1A, 1B, and 3 of this known patent since they correspond to FIGS. 1, 2A, 2B, and 3 of this application. This U.S. patent corresponds to EP-A 0180209 published on May 7, 1986, which EP publication is hereby incorporated by reference in its entirety. In understanding FIGS. 1, 2A, 2B, and 3, reference is also made to copending U.S. patent application Ser. No. 07/563,309 filed by Yutaka SUZUKI (the same applicant as this application) on Aug. 7, 1990, which application is hereby incoporated by reference in its entirety. This copending U.S. patent application corresponds to German patent application Ser. No. P 4025455.0 filed on Aug. 10, 1990, now DE 40 25 455 A1 published on Mar. 14, 1991.

Figure 1:
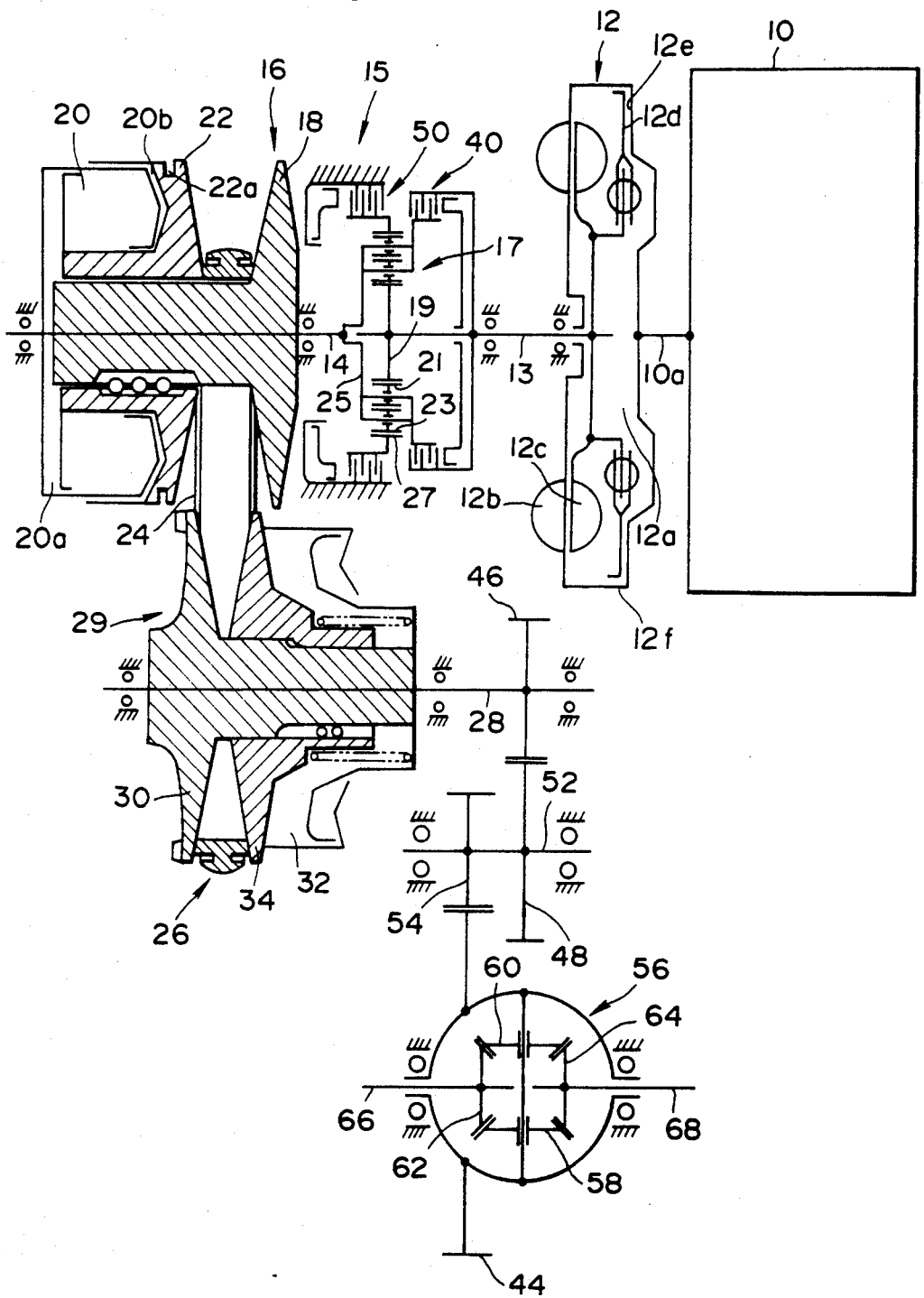
FIG. 1 a schematic diagram of a motor vehicle with an engine followed by a hydrokinetic torque transmitting unit with a lock-up clutch and an automatic transmission.

Referring to FIG. 1, a motor vehicle includes an engine 10 with a throttle which opens in degrees as an accelerator pedal or a gas pedal is depressed, a hydrokinetic torque transmitting unit 12 in the form of a fluid coupling 12, a forward/reverse drive change-over mechanism 15, a V-belt pulley unit 16, 26, and a differential 56. The fluid coupling 12 includes a pump impeller 12b coupled with the engine 10 at its output shaft 10a, a turbine runner 12c coupled with a turbine shaft 13 which is in turn coupled with the forward/reverse drive change-over mechanism 15. The fluid coupling 12 includes a lock-up mechanism, namely, a lock-up clutch, which is hydraulically operated. When the lock-up clutch is engaged, the lock-up mechanism assumes a lock-up state where the pump impeller 12b is mechanically connected to the turbine runner 12c, while, when the lock-up clutch is released, it assumes a release state where the pump impeller 12b is fluidly connected to the turbine runner 12c. The lock-up clutch includes a friction clutch element 12d rotatable with the turbine runner 12c. The clutch element 12d divides the inside of the fluid coupling 12 into two chambers, including a lock-up fluid chamber 12a, on the opposite sides thereof.

The position of parts illustrated in FIG. 1 shows the lock-up mechanism assuming the release state when hydraulic fluid is supplied to the lock-up chamber 12a. The hydraulic fluid is allowed to pass through a clearance 12f formed around the outer periphery of the clutch element 12d to flow into the inside of the fluid coupling 12, i.e., a torous circuit formed by the pump impeller 12b and the turbine runner 12c. When hydraulic fluid is discharged from the lock-up chamber 12a and hydraulic fluid is supplied directly into the inside of the fluid coupling 12, there occurs a pressure difference across the clutch element 12d urging same into engagement with the adjacent wall 12e rotatable with the pump impeller 12b.

Figure 2B:
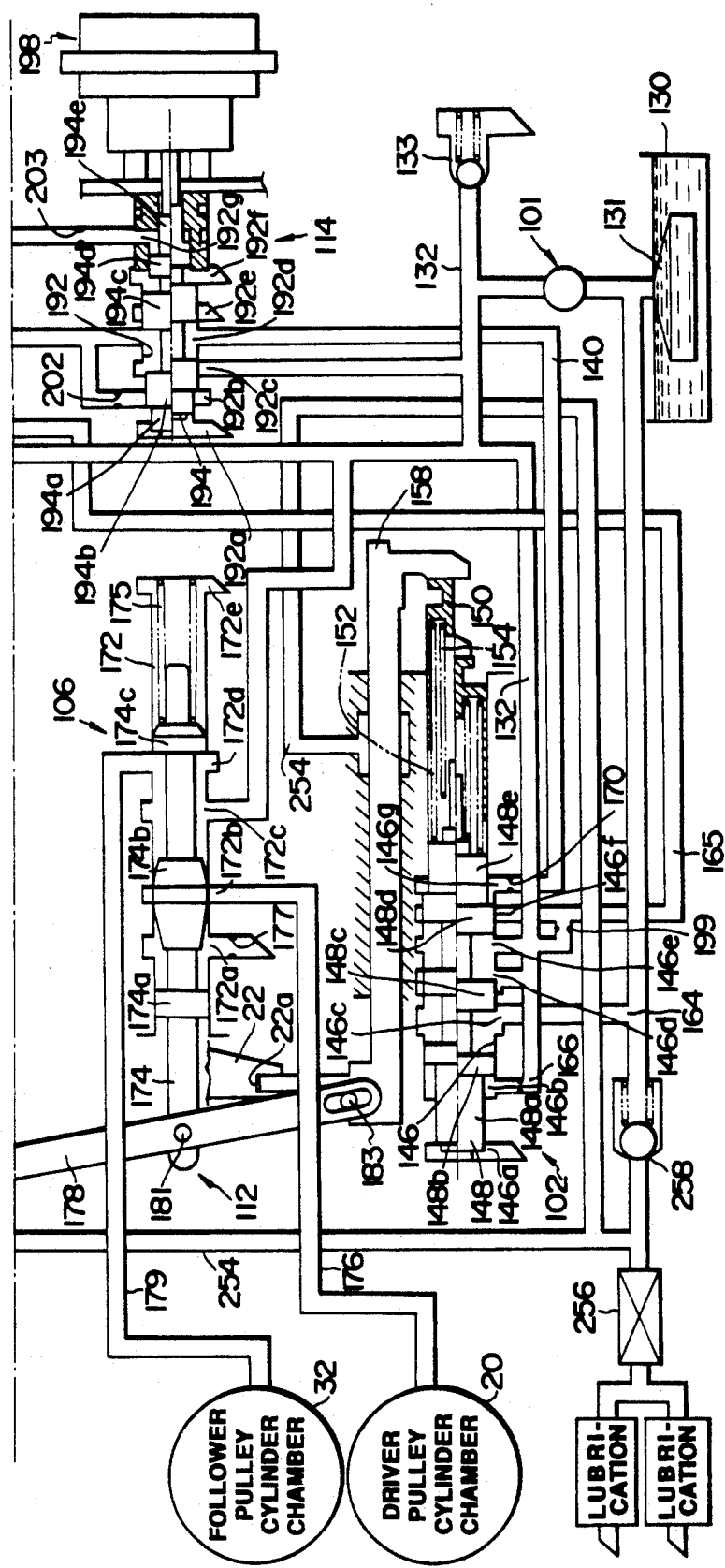

Referring to FIGS. 2A and 2B, a lock-up control valve 122, an electric actuator in the form of an electromagnetically operated valve 118 including a solenoid 224, a throttle valve 114, and a shift command valve 108 are shown. The lock-up control valve 122 has a lock-up position as illustrated by an upper half thereof viewing in FIG. 2A and a lock-up release position as illustrated by a lower half thereof viewing in FIG. 2A. It assumes one of the two positions under the control of the electromagnetically operated valve 118. The throttle valve 114 generates a throttle pressure which is supplied to a forward clutch 40 for a forward drive or a reverse brake 50 for a reverse drive. The magnitude of the throttle pressure is adjustable or variable by the electromagnetically operated valve 118. The electromagnetically operated valve 118 is connected to the lock-up control valve 122 or the throttle valve 114, selectively, under the control of the shift command valve 108. The shift command valve 108 has a spool 182 longitudinally movable by a shift motor 110 in the form of a stepper motor. The stepper motor 110 and the solenoid 224 of the electromagnetically operated valve 118 are under the control of a microcomputer based control unit 300 shown in FIG. 3. The spool 182 is movable within a normal stroke range between a minimum reduction ratio position and also movable beyond the maximum reduction ratio position into an overstroke range next adjacent to the normal stroke range. The spool 182 is formed with two axially spaced lands 182a and 182b which function to connect the electromagnetically operated valve 118 to the lock-up control valve 122 to subject the lock-up control valve 122 to a hydraulic pressure signal generated by the electromagnetically operated valve 118 during movement of the spool 182 within the normal stroke range and disconnect the electromagnetically operated valve 118 from the lock-up control valve 122 during movement of the spool within the overstroke range. During movement of the spool 182 within the normal stroke range, the lands 182a and 182b on the spool 182 function to disconnect the electromagnetically operated valve 118 from the throttle valve 114, while during movement of the spool 182 within the overstroke range, the lands 182a and 182b on the spool 182 function to connect the electromagnetically operated valve 118 to the throttle valve 114. A constant pressure regulator valve 116 generates a constant hydraulic pressure. This constant hydraulic pressure is allowed to act via a signal pressure port 240b on the lock-up control valve 122 when the electromagnetically operated valve 118 is disconnected from the lock-up control valve 122 during the movement of the spool 182 within the overstroke range to keep the lock-up control valve 122 at the lock-up release position, causing the lock-up mechanism of the fluid coupling 12 to assume the lock-up release state. Upon or immediately after a driver's demand for moving the motor vehicle from a standstill, the spool 182 of the shift command valve 108 moves from the overstroke range to the maximum reduction ratio position of the normal stroke range to connect the electromagnetically operated valve 118 to the lock-up control valve 122. Subsequently, the lock-up control valve 122 is allowed to shift between the lock-up release position and the lock-up position under the control of the electromagnetically operated valve 118. The electromagnetically operated valve 118 holds the lock-up control valve 122 in the lock-up release position until the vehicle speed exceeds a lock-up vehicle speed value, and subsequently shifts the lock-up control valve 122 to the lock-up position when the vehicle speed exceeds the lock-up vehicle speed value.

The duty of the solenoid 224 of the electromagnetically operated valve 118 is controlled by an operating signal supplied thereto from the control unit 300. When the duty of the solenoid 224 is 0%, the electromagnetically operated valve 118 blocks fluid communication between a fluid conduit 190 and a drain port 222, allowing the constant hydraulic fluid pressure generated by the constant pressure regulator valve 116 to act on to hold the lock-up control valve 122 at the lock-up release position as illustrated by the lower half thereof viewing in FIG. 2A. When the duty of the solenoid 224 is 100% or a predetermined sufficiently high value adjacent to 100%, the electromagnetically operated valve 118 allows discharge of hydraulic fluid from the hydraulic conduit 190, allowing the lock-up control valve 122 to assume the lock-up position as illustrated by the upper half thereof viewing in FIG. 2A.

The operating signal supplied to the solenoid 224 from the control unit 300 instructs the solenoid 224 to assume the duty determined in the control unit 300. As shown in FIG. 3, the control unit 300 receives signals from an engine revolution speed sensor 301, a vehicle speed sensor 302, a throttle opening degree sensor 303, and a turbine revolution speed sensor 305. The engine revolution speed sensor 301 detects a revolution speed of the engine 10 and generates an engine revolution speed indicative signal indicative of the engine revolution speed detected. The vehicle speed sensor 302 detects a vehicle speed of the motor vehicle and generates a vehicle speed indicative signal indicative of the vehicle speed detected. The throttle opening degree sensor 303 detects an opening degree of the engine throttle, as a variable representative of the engine load, and generates a throttle opening degree indicative signal indicative of the throttle opening degree detected. The turbine revolution speed sensor 305 detects a revolution speed of the turbine shaft 13 and generates a turbine revolution speed indicative signal indicative of the turbine revolution speed detected. These signals are fed to the control unit 300 and used upon executing the program shown in FIG. 4.

Figure 4:
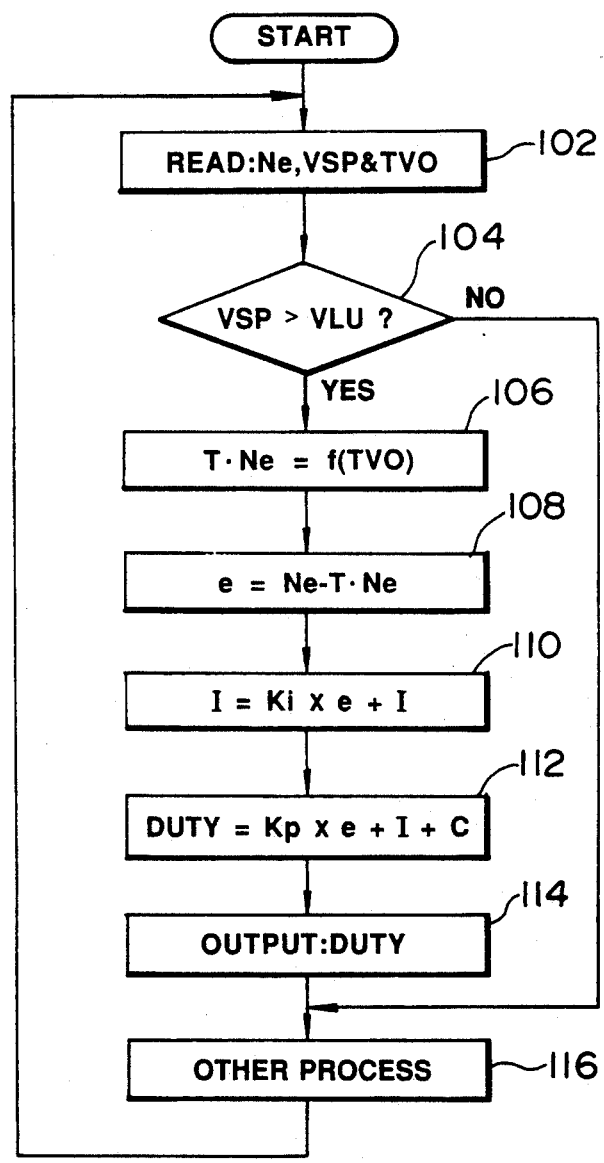
FIG. 4 is a flow diagram of a control program stored in a of the control unit.

In order to effect engagement of the lock up mechanism without causing any undesired increase in engine revolution speed, the control unit 300 executes the program shown in FIG. 4. The execution of this program is repeated at a predetermined interval, for example, 1 msec.

Figure 5:
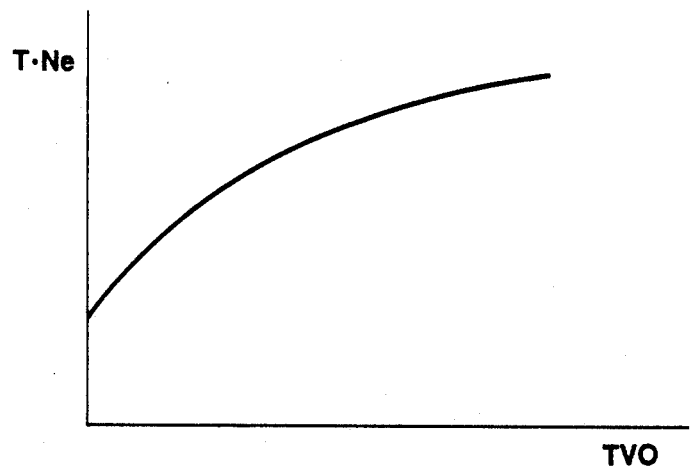
FIG. 5 is a graph illustrating a function T·Ne=f(-TVO), where T·Ne: a target engine revolution speed, and TVO: a throttle opening degree representative of an engine load.

In FIG. 4, reading operation is performed at a step 102 to store an engine revolution speed data Ne, a vehicle speed data VSP, a throttle opening degree data TVO, and a turbine revolution speed data Nt which are derived from the signals of the corresponding sensors 301, 302, 303, and 305. Then, the program proceeds to a decision step 104 where it is determined whether the vehicle speed data VSP is greater than a predetermined lock-up vehicle speed value VLU or not. If the inquiry at the step 104 results in negative, the program proceeds to a block 116 where the other process is performed. If the inquiry at the step 104 results in affirmative, the program proceeds to a step 106 where a table look-up operation of FIG. 5 is performed using the throttle opening degree data TVO to obtain a target engine revolution speed value T·Ne. After the step 106, the program proceeds to a step 108 where a difference data e is given by calculating a difference between the engine revolution speed data Ne and the target engine revolution speed value T·Ne. Following this step 108, an integral term I is incremented by a product of Ki×e (where: Ki is an integral gain) at a step 110. Following this step 110, the program proceeds to a step 112 where a duty data DUTY is updated by calculating the following equation:

$$DUTY = Kp \times e + I + C$$

where:
Kp is a proportional gain, and
C is an initial value.

From this equation, it will be appreciated that the duty (DUTY) includes the initial value (C) and a term (Kp×e+I) related to the difference (e). The duty data DUTY is outputted to the solenoid 224 at a step 114 in the form of the operating signal supplied from the control unit 300.

Although not shown in the program shown in FIG. 4, the feedback control discussed above is interrupted after the partial or the full engagement of the lock-up mechanism is detected to hold the lock-up mechanism in its fully engaged position until subsequently the vehicle speed drops to a lock-up release vehicle speed value. The full engagement condition of the lock-up mechanism can be detected by detecting the electric actuator, i.e., the solenoid 224, since the solenoid 224 assumes fully energized position to cause the lock-up control valve 122 to assume the lock-up state. If desired, the full engagement condition of the lock-up mechanism can be detected by detecting a slip in the hydrokinetic torque transmitting unit since the slip becomes zero at the full engagement position of the lock-up mechanism.

Since the engine speed is used as a target to be controlled, this lock-up control is stable and accurate. This is because the engine revolution speed has a sufficiently great value.

Although the engine load is represented by the throttle opening degree, it may be represented by the engine intake manifold vacuum or intake airflow rate. Although the target engine revolution speed is set as a function of the engine load, it may be set as a function of a vehicle speed.

What is claimed is:

1. A system for a control of a lock-up clutch in a hydrokinetic torque transmitting unit including a pump impeller coupled with an engine, and a turbine runner, the lock-up clutch being engageable to connect the turbine runner to the pump impeller, the system comprising:

means, including an electric actuator, for controlling engagement of the lock-up clutch in response to an operating signal supplied thereto;

means for generating said operating signal supplied to said engagement controlling means, wherein, during engagement of the lock-up clutch, a target engine revolution speed is determined, and an actual engine revolution speed is detected, and said operating signal is modified in such a direction as to decrease a difference between said determined target engine revolution speed and said detected actual engine revolution speed toward zero until the lock-up clutch is completely engaged.

2. A system as claimed in claim 1, wherein an instant when the lock-up clutch is completely engaged is detected when the electric actuator assumes a state corresponding to the complete engagement of the lock-up clutch.

3. A system as claimed in claim 1, wherein an instant when the lock-up clutch is completely engaged is detected when a slip in the hydrokinetic torque transmitting unit becomes zero.

4. A system as claimed in claim 1, wherein the target engine revolution speed is a function of a load on the engine.

5. A method for a control of a lock-up clutch in a hydrokinetic torque transmitting unit including a pump impeller coupled with an engine, and a turbine runner, the lock-up clutch being engageable to connect the turbine runner to the pump impeller, the method comprising the steps of:

controlling engagement of the lock-up clutch in response to an operating signal;

generating said operating signal, wherein, during engagement of the lock-up clutch, a target engine revolution speed is determined, and an actual engine revolution speed is detected, and said operating is modified in such a direction as to decrease a difference between said determined target engine revolution speed and said detected actual engine revolution speed toward zero until the lock-up clutch is completely engaged.

6. A system for a control of a lock-up clutch in a hydrokinetic torque transmitting unit including a pump impeller coupled with an engine, and a turbine runner, the lock-up clutch being engageable to connect the turbine runner to the pump impeller, the system comprising:

means, including an electric actuator, for controlling engagement of the lock-up clutch in response to an operating signal supplied thereto;

engine revolution speed sensor means for detecting an actual engine revolution speed of the engine and generating an actual engine revolution speed indicative signal indicative of said detected actual engine revolution speed; and a control unit including, means for generating said operating signal supplied to said engagement controlling means;

means for determining a target engine revolution speed during engagement of the lock-up clutch and generating a target engine revolution speed indicative signal indicative of said determined target engine revolution speed;

means for calculating a difference between said target engine revolution speed indicative signal and said actual engine revolution speed indicative signal during engagement of the lock-up clutch and generating a difference indicative signal indicative of said calculated difference; and means for modifying said operating signal, during engagement of the lock-up clutch, in such a direction as to decrease said difference indicative signal toward zero until the lock-up clutch is completely engaged.

7. A method for a control of a lock-up clutch in a hydrokinetic torque transmitting unit including a pump impeller coupled with an engine, and a turbine runner, the lock-up clutch being engageable to connect the turbine runner to the pump impeller, the method comprising the steps of:

generating an operating signal;

controlling engagement of the lock-up clutch in response to said operating signal;

detecting an actual engine revolution speed of the engine and generating an actual engine revolution speed indicative signal indicative of said detected actual revolution speed;

determining a target engine revolution speed during engagement of the lock-up clutch and generating a target engine revolution speed indicative signal indicative of said determined target engine revolution speed;

calculating a difference between said target engine revolution speed indicative signal and said actual engine revolution speed indicative signal during engagement of the lock-up clutch and generating a difference indicative signal indicative of said calculated difference; and modifying said operating signal, during engagement of the lock-up clutch, in such a direction as to decrease said difference indicative signal toward zero until the lock-up clutch is completely engaged.

* * * * *